3,288,456
AUXILIARY SPRING CONSTRUCTION FOR USE ON AUTOMOTIVE VEHICLES
Angelo F. Paioletti and Edwin E. Musser, both of 1330 N. Cameron St., Harrisburg, Pa.
Original application Aug. 2, 1962, Ser. No. 214,413, now Patent No. 3,227,436, dated Jan. 4, 1966. Divided and this application Oct. 21, 1965, Ser. No. 499,853
6 Claims. (Cl. 267—45)

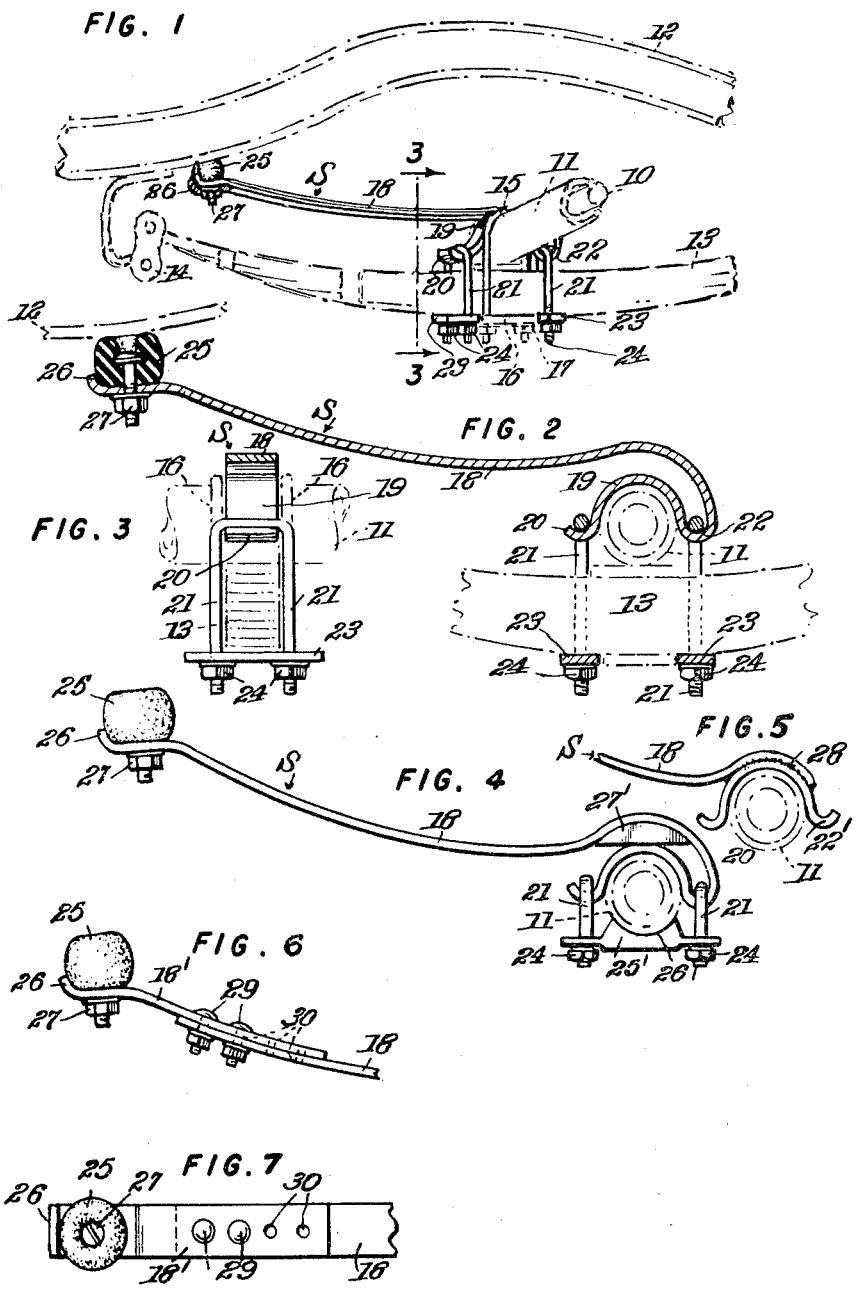

The present application is a division of our pending application Serial No. 214,413, filed August 2, 1962, now Patent No. 3,227,436.

This invention relates to an auxiliary spring construction for use on automotive vehicles and particularly those equipped with inboard type suspension springs so as to enhance the comfort of riding, levelling of the vehicle body, add carrying capacity and release pressure from the shackle bolts and rear suspension spring means.

It is particularly aimed to provide such a structure which is attachable to and extends rearwardly from a rear axle housing as a cantilever having its distal end beneath and contacting the vehicle chassis or body.

Further an object is to provide such a structure as is attachable with minimum labor in that it has means which will suspend and locate its attaching bolts unitarily therewith incidental to installation on or adjustment and tightening of the nuts of the bolts to the vehicle.

Various additional objects and advantages will in part be pointed out and otherwise become apparent from a consideration of the description following taken in connection with accompanying drawings illustrating an operative embodiment.

In said drawings:

FIGURE 1 is a fragmentary view partly in perspective illustrating in connection with vehicle fragments an installation of my improved cantilever spring construction;

FIGURE 2 is a view in central section taken longitudinally of the spring and its fastenings;

FIGURE 3 is a cros-section taken on line 3—3 of FIGURE 1;

FIGURE 4 is a side elevation of a modified form of spring construction;

FIGURE 5 is a fragmentary side elevation of a modified form of adjustable construction for the front end of either of the previously described forms;

FIGURE 6 is a fragmentary side view illustrating the use of a sectional cantilever arm; and FIGURE 7 is a plan view of the parts of FIGURE 6.

Referring specifically to the drawing wherein like reference characters designate corresponding parts throughout the different views and first to the forms of FIGURES 1 to 3, representative parts of any suitable automotive vehicle are again suggested fragmentarily like the rear axle 10, its housing 11, one of the two side beams 12 of the chassis, a suspension spring structure 13, and one of the securing shackle structures 14 for the latter. The usual spaced U-shaped securing bolts straddling the axis housing and located on opposite sides of spring 13 are shown at 15, the bolts passing through plates 16 which are engaged from below by nuts 17.

My cantilever spring structure, preferably metallic, is shown at S. It is to be understood that preferably two of such structures S are employed, one on each side at the rear end of an automotive vehicle, but as they are duplicates in construction and mounting an illustration and description of but one will suffice.

Said spring S may be made as a bar-like structure and preferably in one piece having an elongated cantilever arm 18, preferably slightly curved as shown, and at the proximal end has an arched saddle 19 resting on housing 11 between the bolts 15 so as to be maintained thereby against lateral displacement.

Said saddle consists of a forward end portion of the piece comprising structure S extending downwardly and thence returned toward the rear end, preferably is spaced relation to the surface of structure S above it to enhance resilience and better attain the objects of my invention.

The free or distal end of saddle 19 is a lug 20 which is concave or otherwise depressed to form a seat for one of the U-shaped attaching bolts of a pair 21. The proximal end or junction of said saddle with the remainder of cantilever arm 18 forms a concave or depressed seat at 22 for the other bolt of said pair 21. The legs of U-shaped bolts 21 are located on opposite sides of spring 13, extending below the same and through fastening plates 23 engaging the under surface of spring 13. Nuts 24 are threaded onto the legs of said bolts 21 and are tightened against the under surface of said plates 23. It is clear that plates 23 may be made integral with plate or plates 16 in which event the resulting single plate would replace plate or plates 16 and serve for all of the plates 16 and 23.

The free or distal end of the cantilever arm S contacts the chassis frame 12. Such contact may be direct or by means of a buffer block 25 which may be of any suitable shaped and material and mounted on the arm S. For instance, this block 25 may be of rubber, leather, plastic or a composite material and be fastened to arm S against a lug 26 as by bolt 27.

In installing the structure S on a vehicle, usually an automotive vehicle with the inboard type of suspension springs, the rear of the chassis of the automobile is jacked or raised to permit the rear axle to hang from either side. Structure S with the bolts 21 (minus nuts 24 and plates 23) suspended in the seats 20 and 22 is handled as a unit and disposed with the saddle 19 between the arches of bolts 15 as shown in the drawings with block 25 spaced below chassis 12, after which the plates 23 are applied as shown, followed by loosely applying nuts 24. The vehicle is then lowered and the nuts 24 are adjusted and tightened to level the vehicle or provide the arm 18 with the desired tension. It will be clear that to raise the vehicle the front nuts 24 are tightened and the rear nuts 24 are released, while to lower the vehicle the reverse adjustment of nuts 24 is true.

Various changes may be made within the spirit and scope of the invention. For instance, the form of FIGURE 4 may be employed for attachment to an automotive vehicle which does not have the conventional springs at 13. In such case structure S is the same as in FIGURES 1 to 3 except for plates 23 and hence corresponding parts have thus been given the same reference characters. In lieu of said plates 23, I employ a clamp plate 26 through which the legs of bolts 21 pass and against the under surface of which the nuts 24 bear. Clamp plate 25 preferably has an arcuate seat 26 to fit the housing 11 and enable more effective clamping of the saddle plate and plate 25 to such housing.

In order to prevent any or undue flexing of spring arm 18 from the zone of its contact with the front bolt 21 in either form of the invention, a contact block 27′ preferably of metal may be disposed in the space between and in contact with saddle 19 permanently or removably secured in place in any suitable manner.

As shown in FIGURE 5 the cantilever arm and saddle may be made separately and welded together as at 28. In this form, the structure otherwise is like that of the other forms and the same reference characters apply.

In all forms, as suggested in FIGURES 6 and 7, cantilever arm 18 may have an extension 18′ which mounts the buffer 25 in the same manner as the other forms. This extension provides for adjustment of the length and tension of the cantilever arm. Extension 18′ is adjustably secured to arm 18 for instance by bolts 20 selectively engageable in various bolt holes 30.

What is claimed is:

1. An auxiliary cantilever spring means for use on a vehicle having a relatively movable chassis part and suspension axle part within a housing, comprising an arch, an elongated arm extending from the arch and at a point remote to the arch arranged to contact the first-mentioned part, said arch being below and spaced from the arm, and at one end connected thereto, said arch adjacent each end having a depressed seat, and means engaging said seats operable to secure the arch stationarily to the housing.

2. An auxiliary cantilever spring means for use on a vehicle having a relatively movable chassis part and suspension axle part within a housing, comprising an arch, an elongated arm extending from the arch and at a point remote to the arch arranged to contact the first-mentioned part, said arch being below and spaced from the arm, and at one end connected thereto, said arch adjacent each end having a depressed seat, and means engaging said seats operable to secure the arch stationarily to the housing, bolts suspended from said seats, and fastening nuts adjustably mounted on said bolts.

3. An auxiliary cantilever spring means for use on a vehicle having a relatively movable chassis part and suspension axle part within a housing, comprising an arch, an elongated arm extending from the arch and at a point remote to the arch arranged to contact the first-mentioned part, said arch adjacent each end having a depressed seat, a loop integrailly connecting said axle and arm and providing one of said seats, and means engaging said seats operable to secure the arch stationarily to the housing.

4. An auxiliary cantilever spring means for use on a vehicle having a relatively movable chassis part and suspension axle part within a housing, comprising an arch, an elongated arm extending from the arch and at a point remote to the arch arranged to contact the first-mentioned part, said arch being below and spaced from the arm, and at one end connected thereto, said arch adjacent each end having a depressed seat, a contact block between the arch and portion of the cantilever arm above it to control undue flexing at the zone of connection of the arm and arch, and means engaging said seats operable to secure the arch stationarily to the housing.

5. A cantilever spring means for use on a vehicle having a relatively movable chassis part and suspension part, comprising a bar-like structure including an arch having a distal end and a proximal end, means securing said arch to the last-mentioned part, and said bar-like structure also including an elongated arm extending from the proximal end of, over and beyond the arch, and at a point remote from the arch being arranged to contact the first-mentioned part.

6. A cantilever spring means for use on a vehicle having a relatively movable chassis part and suspension axle part, comprising a bar-like structure including an arch having a distal end and a proximal end, means at both ends of the arch securing the arch to the last-mentioned part in adjusted position around the longitudinal axis of said axle part, and said bar-like structure also including an elongated arm extending from the proximal end of, over and beyond the arch and at a point remote from the arch being arranged to contact the first mentioned part.

References Cited by the Examiner

UNITED STATES PATENTS

| | | | |
|---|---|---|---|
| 2,372,201 | 3/1945 | Hellwig | 267—45 |
| 2,791,419 | 5/1957 | Whalen | 267—45 |
| 2,826,407 | 3/1958 | Scheubtun, et al. | 267—45 |
| 2,973,196 | 2/1961 | Scheubtun, et al. | 267—45 |
| 3,038,715 | 6/1962 | Davidson et al. | 267—16 |
| 3,051,468 | 8/1962 | Levet | 267—16 |
| 3,149,689 | 9/1964 | Adolff et al. | 267—52 X |
| 3,154,300 | 10/1964 | Wenzel | 267—52 X |
| 3,154,323 | 10/1964 | Hooven | 267—52 X |

ARTHUR L. LA POINT, *Primary Examiner.*

R. M. WOHLFARTH, *Assistant Examiner.*